United States Patent [19]

Conrad

[11] Patent Number: 5,156,372

[45] Date of Patent: Oct. 20, 1992

[54] METERING DEVICE FOR GRANULAR MATERIALS

[76] Inventor: Larry M. Conrad, R.R. 1 - Box 103, Delta, Iowa 52550

[21] Appl. No.: 779,075

[22] Filed: Oct. 18, 1991

[51] Int. Cl.$^5$ .............................................. F16K 31/08
[52] U.S. Cl. .................... 251/65; 251/129.21; 251/298
[58] Field of Search ............... 251/65, 129.21, 303, 251/298

[56] References Cited

U.S. PATENT DOCUMENTS 3,120,943  2/1964  Donelan ................... 251/129.21
3,245,652  4/1966  Roth ........................ 251/129.21 X
4,587,795  5/1986  Yamashita ................ 251/65 X

*Primary Examiner*—Arnold Rosenthal
*Attorney, Agent, or Firm*—Henderson & Sturm

[57] ABSTRACT

A metering device for controlling the flow of granular material through a conduit. The metering device includes a electrical coil operably associated with the conduit, a ferromagnetic latching strip disposed in the magnetic field produced by the coil, and a pivoting gate including a magnet that is attracted toward and repelled from the latching strip as the direction of electrical current flowing through the coil is changed.

3 Claims, 2 Drawing Sheets

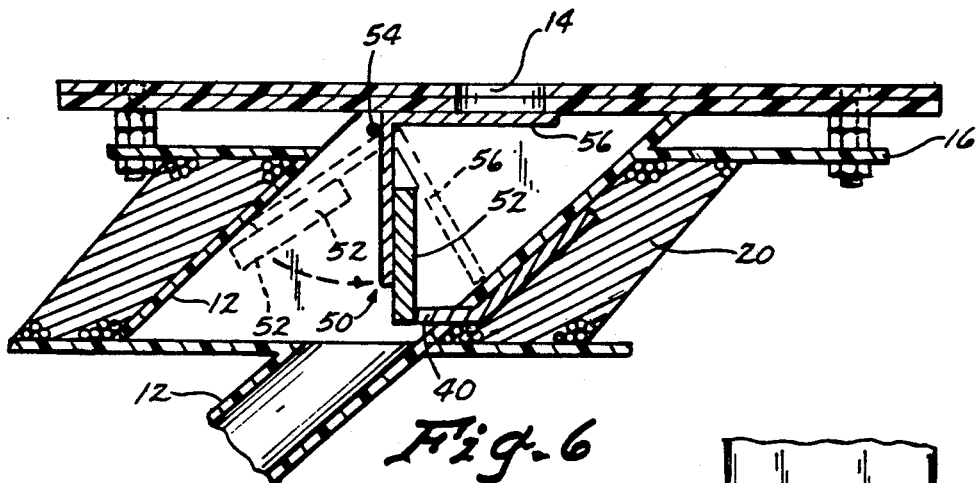
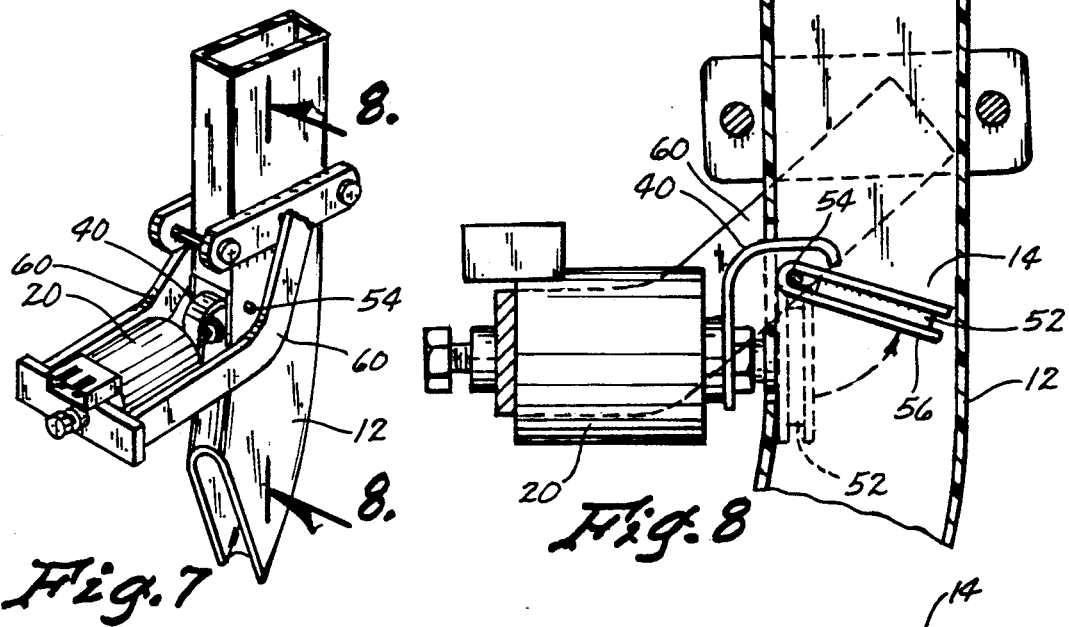
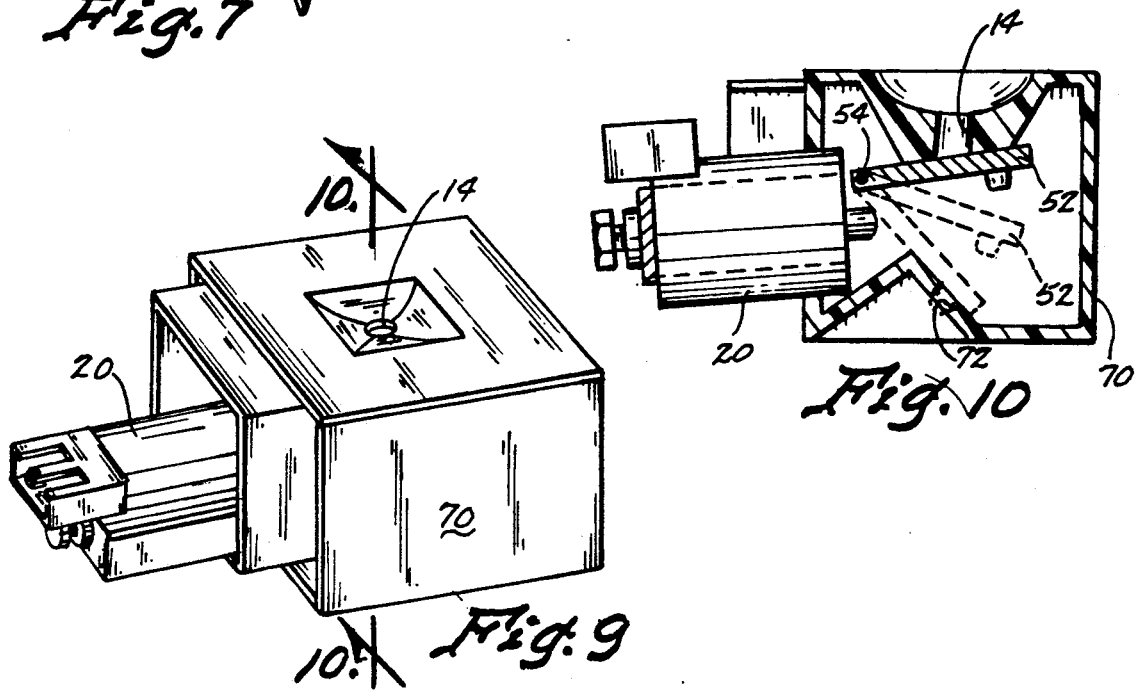

METERING DEVICE FOR GRANULAR MATERIALS

TECHNICAL FIELD

This invention relates to metering devices, and more particularly to electromagnetic metering devices for granular materials.

BACKGROUND ART

Various electromagnetic metering devices are known but none are completely satisfactory for handling granular materials. Devices opened and closed by a sliding action, such as a solenoid value, are often jammed by the granular material and are slow to open and close.

Those concerned with these and other problems recognize the need for an improved metering device for granular materials.

DISCLOSURE OF THE INVENTION

The present invention provides a metering device for controlling the flow of granular material through a conduit. The metering device includes a electrical coil operably associated with the conduit, a ferromagnetic latching strip disposed in the magnetic field produced by the coil, and a pivoting gate including a magnet that is attracted toward and repelled from the latching strip as the direction of electrical current flowing through the coil is changed.

An object of the present invention is the provision of an improved metering device for granular materials.

Another object is to provide a metering device that is uncomplicated in structure and inexpensive to manufacture.

A further object of the invention is the provision of a metering device that is durable and easy to maintain.

Still another object is to provide a metering device for granular materials that minimizes the problems of jamming due to dust and material lodging between moving parts.

A still further object of the present invention is the provision of a metering device that can be rapidly opened and closed.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 6 is an enlarged sectional view of a third embodiment of the invention similar to the second embodiment but showing the gate pivot point raised to accommodate a different mounting structure;

FIG. 7 is a partial perspective view of a fourth embodiment of the invention;

FIG. 8 is an enlarged sectional view taken along line 8—8 of FIG. 7;

FIG. 9 is a partial perspective view of a fifth embodiment of the invention; and FIG. 10 is a sectional view taken along line 10—10 of FIG. 9.

BEST MODE FOR CARRYING OUT THE INVENTION

Figure 1:
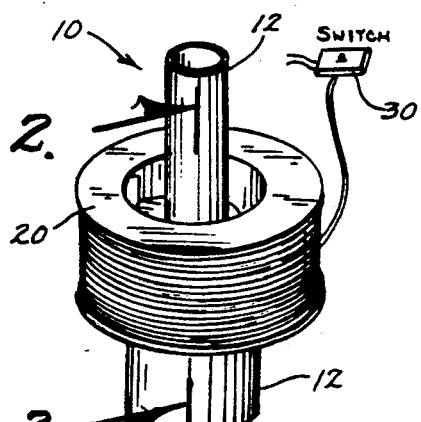
FIG. 1 is a partial perspective view of one embodiment of the invention.
Figure 2:
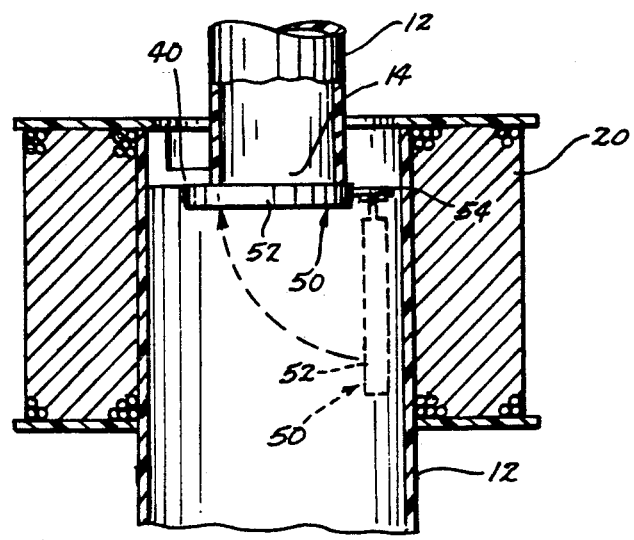
FIG. 2 is an enlarged sectional view taken along line 2—2 of FIG. 1.

Referring now to the drawings, wherein like reference numerals designate identical or corresponding parts throughout the several views, FIGS. 1 and 2 show one embodiment of the metering device (10) of the present invention suitable for mounting in the granular insecticide conduit (12) of a conventional agricultural planter. The metering device (10) includes an electrical coil (20) disposed to surround the conduit (12), a switch (30) for changing the direction of current flowing through the coil, an iron latching strip (40) disposed within the magnetic field produced by the coil (20), and a gate (50) formed of a round magnet (52) pivotally attached to the conduit by a hinge (54). The gate (50) is pivotally movable to the full-line position of FIG. 2 to cover the discharge opening (14) in the conduit (12) when the magnet (52) is attracted to and contacts the latching strip (40).

Granular material flows down the conduit (12) and out the discharge opening (14) when the gate (50) is open. The position of the flow gate (50) is controlled by the direction of the current flow in coil (20). When the magnetic field of the coil (20) is in the right direction, the flow gate (50) is forced up against the discharge opening (14), cutting off the granular flow. The iron latch strip (40) holds the flow gate (50) closed even when the power is turned off. The iron latch strip (40) is also necessary because the gate (50) will not completely close without it, or open or close with a quick response. When the magnetic field from the coil (20) is reversed, the iron latch strip (40) changes its magnetic polarity and repels the magnet (52). The magnetic field also repels the magnetic flow gate (50) so it is forced into the open position. The gate (50) will remain in the position it was in when the current is turned off, unless it is given a hard jolt.

Figure 3:
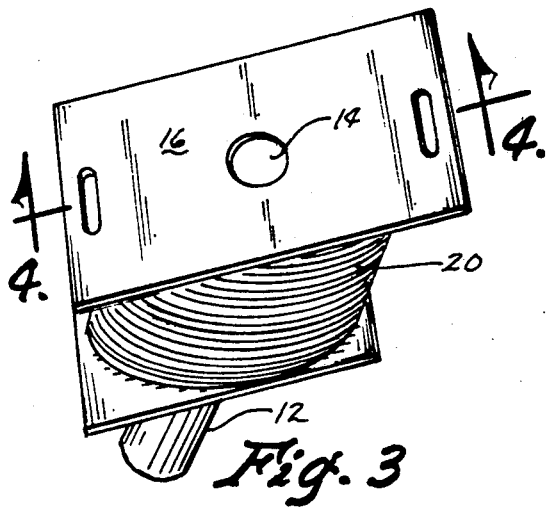
FIG. 3 is a partial perspective view of a second embodiment of the invention.
Figure 5:
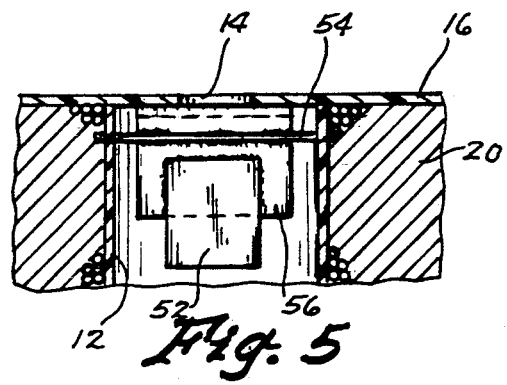
FIG. 5 is a sectional view taken along line 5—5 of FIG. 4.
Figure 4:
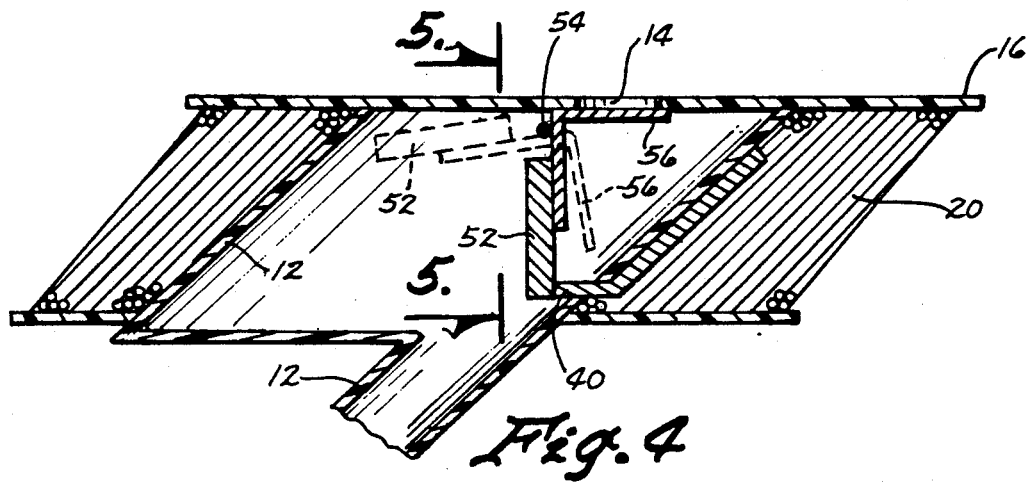
FIG. 4 is an enlarged sectional view taken along line 4—4 of FIG. 3.

FIGS. 3-5 show a second embodiment of the metering device (10) that is adapted to bolt to the bottom of an International Harvester 400 planter insecticide hopper (not shown). A plate (16) bolts to the bottom of the hopper. The flow gate (50) is redesigned because the magnet (52) needs to remain inside of the coil (20). The angled bracket (56) which forms a part of the flow gate is made of aluminum.

The operation of the second embodiment is basically the same as that of the first embodiment. Granules flow through the discharge opening (14) and the flow gate (50) pivots to open and close the discharge opening (14). In this embodiment the flow gate (50) automatically closes by gravity, anytime the flow of current doesn't hold it open. Therefore, electrical power is only needed to open it but it will not close as strongly as if it were closed with power.

FIG. 6 shows a third embodiment at the metering device (10) suitable for use with an International Harvester 800-900 planter. The only difference between it and the second embodiment is that the flow gate magnet (52) is mounted farther from the hinge (54), allowing the discharge opening (14) to be raised above plate (16). This embodiment will bolt in the hole on the planter that holds the funnel that the insecticide hose attaches to, therefore, no modifications are needed to mount it to the planter.

FIGS. 7 and 8 show a fourth embodiment of the invention where the coil (20) is disposed outside of the conduit (12). A metallic frame for magnetic flux guide (60), extends around the coil (20). The flux guide (60) routes the magnetic flux lines to provide the proper magnetic field to control the gate magnet (52).

FIGS. 9 and 10 show a fifth embodiment of the invention similar to the fourth embodiment but incorporating a chamber (70) having a material outlet (72). This design reduces the possibility of chemical waste due to unit malfunction. The other embodiments can be left in a condition where the granular material will flow through the conduit (12) without obstruction when the gate (50) is in the open position. This embodiment works in a toggle fashion where the current must be turned on and then reversed to allow chemical to pass through the unit. Thus each time it toggles a specific amount of chemical is released from the chamber (70).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A metering device for controlling the flow of granular material through a conduit, the conduit including a discharge opening disposed in flow communication with a material supply, the metering device comprises:

an electrical coil operably attached in a surrounding relationship relative to the conduit and being disposed to produce a magnetic field when electrical current flows through the coil;

switch means for selectively changing the direction of the electrical current flowing through the coil;

a ferromagnetic latching strip operably attached to one side of the conduit adjacent the discharge opening and disposed within the magnetic field produced by the coil; and a gate pivotally attached to the other side of the conduit adjacent the discharge opening and being movable between a closed position covering the discharge opening and an open position spaced from the discharge opening, the gate including a permanent magnet which is attracted to and contacts the latching strip and covers the discharge opening when current flows through the coil in a first direction and which is repelled from and is spaced away from the latching strip and the discharge opening when current flows through the coil in a second direction.

2. The metering device as in claim 1; wherein said discharge opening is circular; and, wherein said magnet has a generally flat disc shaped configuration.

3. The metering device of claim 1 wherein the latching strip is made of iron.

* * * * *